United States Patent
Lee et al.

(10) Patent No.: US 10,075,566 B2
(45) Date of Patent: Sep. 11, 2018

(54) PACKET TRANSMITTER, INTERFACE DEVICE AND COMPUTING SYSTEM INCLUDING THE SAME

(71) Applicant: Samsung Electronics Co., Ltd., Suwon-si, Gyeonggi-do (KR)

(72) Inventors: JaeChol Lee, Suwon-si (KR); Seong-Yoon Kim, Seoul (KR); Eung-Sup Kim, Suwon-si (KR); Sang-Heon Lee, Seongnam-si (KR); Woon-Yong Jo, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 356 days.

(21) Appl. No.: 14/714,499

(22) Filed: May 18, 2015

(65) Prior Publication Data

US 2016/0043840 A1    Feb. 11, 2016

(30) Foreign Application Priority Data

Aug. 6, 2014    (KR) .................. 10-2014-0101121

(51) Int. Cl.
*H04L 29/06* (2006.01)
*H04L 12/861* (2013.01)
*H04L 1/00* (2006.01)

(52) U.S. Cl.
CPC .............. *H04L 69/22* (2013.01); *H04L 49/90* (2013.01); *H04L 1/0041* (2013.01)

(58) Field of Classification Search
CPC ..... H04L 1/0041; H04L 12/417; H04L 29/06; H04L 29/06027; H04L 49/90; H04L 69/22
See application file for complete search history.

(56) References Cited

U.S. PATENT DOCUMENTS

| 4,667,323 A | * | 5/1987 | Engdahl | ................ H04L 12/417 |
| | | | | 370/451 |
| 6,735,647 B2 | | 5/2004 | Boyd et al. | |
| 6,956,853 B1 | * | 10/2005 | Connery | ................. H04L 49/90 |
| | | | | 370/392 |
| 8,743,985 B2 | | 6/2014 | Li et al. | |

(Continued)

FOREIGN PATENT DOCUMENTS

| EP | 2314002 A1 | 4/2011 |
| JP | 5162939 B2 | 3/2013 |

(Continued)

*Primary Examiner* — Khoa Huynh
(74) *Attorney, Agent, or Firm* — Harness, Dickey & Pierce, P.L.C.

(57) ABSTRACT

A packet transmitter includes a higher layer transmission block and a lower layer transmission block. The higher layer transmission block generates a higher layer data signal including payload data and a header for each packet of a plurality of packets based on an application layer data signal and an application layer control signal. The higher layer transmission block outputs the header after the payload data through the higher layer data signal. The lower layer transmission block generates a lower layer data signal including the header and the payload data for each packet based on the higher layer data signal and a higher layer control signal. The lower layer transmission block outputs the payload data after the header through the lower layer data signal.

18 Claims, 16 Drawing Sheets

(56) References Cited

U.S. PATENT DOCUMENTS

| | | | |
|---|---|---|---|
| 2004/0039833 A1* | 2/2004 | Ludwig | H04L 29/06 709/230 |
| 2005/0265390 A1 | 12/2005 | Lee et al. | |
| 2006/0256875 A1* | 11/2006 | McClellan | H04L 1/0041 375/242 |
| 2007/0097978 A1* | 5/2007 | Nakamura | H04L 29/06027 370/392 |
| 2009/0046626 A1 | 2/2009 | Shao et al. | |
| 2009/0201949 A1 | 8/2009 | Sunahara | |
| 2010/0232356 A1 | 9/2010 | Maheshwari et al. | |
| 2012/0079148 A1 | 3/2012 | Urzi et al. | |
| 2013/0100964 A1 | 4/2013 | Pani et al. | |

FOREIGN PATENT DOCUMENTS

| | | |
|---|---|---|
| JP | 5318277 B2 | 10/2013 |
| KR | 0333705 B1 | 4/2002 |
| KR | 2005-0114567 A | 12/2005 |
| KR | 0847168 B1 | 7/2008 |
| KR | 1269802 B1 | 5/2013 |

\* cited by examiner

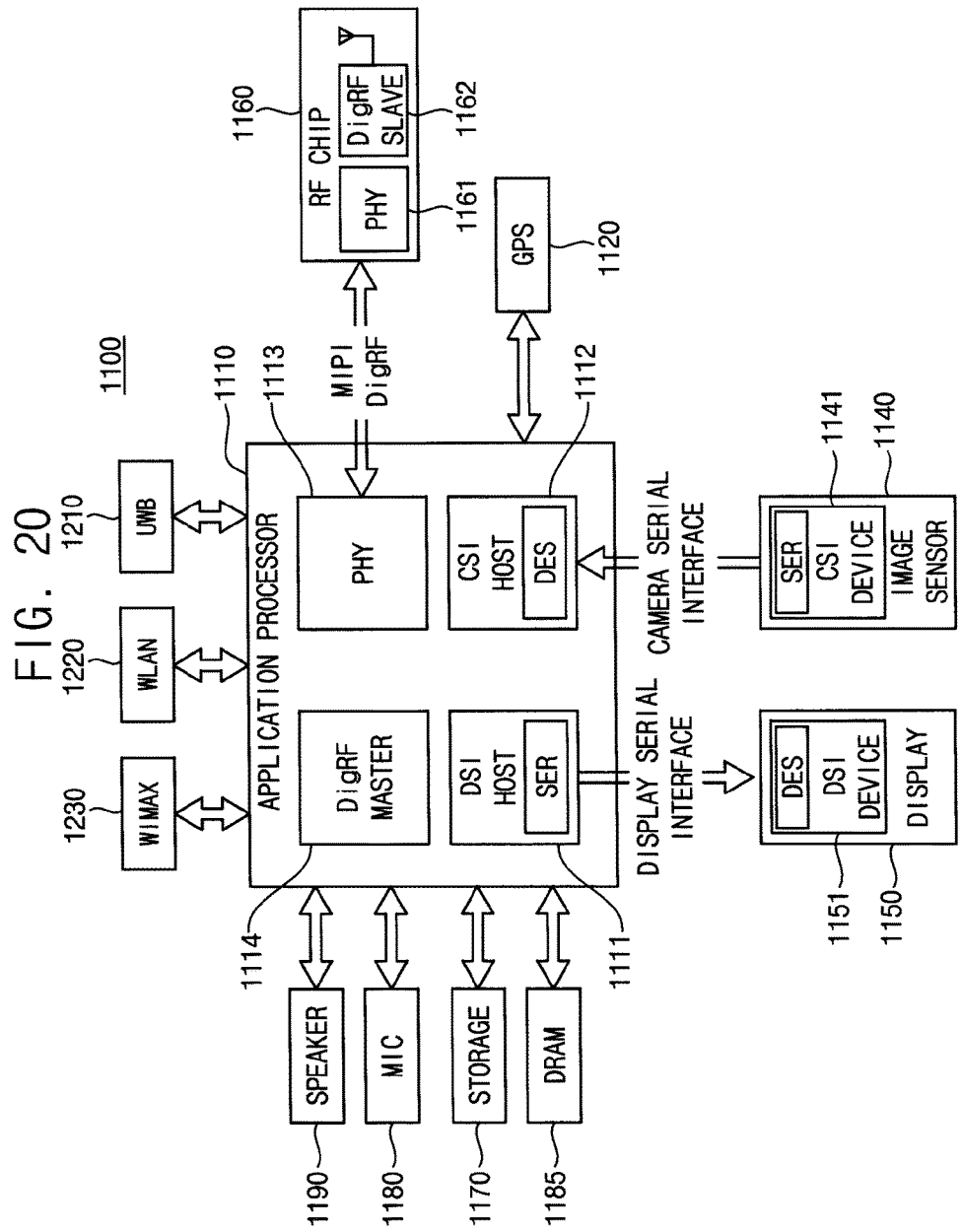

PACKET TRANSMITTER, INTERFACE DEVICE AND COMPUTING SYSTEM INCLUDING THE SAME

CROSS-REFERENCE TO RELATED APPLICATION

This U.S. Non-provisional application claims priority under 35 USC § 119 to Korean Patent Application No. 10-2014-0101121, filed on Aug. 6, 2014, in the Korean Intellectual Property Office (KIPO), the disclosure of which is incorporated by reference in its entirety herein.

BACKGROUND

1. Technical Field

Example embodiments relate generally to semiconductor integrated circuits, and more particularly to a packet transmitter, an interface device and/or a computing system including the packet transmitter.

2. Discussion of the Related Art

Data transfer amounts are increasing significantly as performance is improved and/or as resolution is increased for a display device, image sensors, etc. included in electronic devices, such as mobile devices. Mobile device performance improvements and/or resolution increases are due to increased complexity of the mobile devices. Internal wiring becomes more complicated and electromagnetic (EM) interference becomes more serious as the electronic device develops and/or increases in complexity. To reduce issues arising due to complex internal wirings and EM interference, researchers are attempting to develop on serial interfaces such as mobile industry processor interface (MIPI), mobile display digital interface (MIDI), etc.

Typical packet transmitters employing protocols, such as MIPI unified protocol (UniPro), generally perform segmentation and retransmission of data by different layers. In this case, the layers operate independently and use respective buffers and/or memories, thereby increasing latency, occupation area, and/or power consumption of the packet transmitter.

SUMMARY

According to various example embodiments of the inventive concepts, a packet transmitter generates packets with reduced latency and occupation area.

At least one example embodiment of the inventive concepts relates to a packet transmitter included in a computing device.

According to at least one example embodiment of the inventive concepts a packet transmitter is included in a computing device, and the packet transmitter includes a higher layer transmission block configured to generate a higher layer data signal, the higher layer data signal including payload data and a header for each packet of a plurality of packets, the payload data and the header for each packet being generated based on an application layer data signal and an application layer control signal, output the payload data prior to the header through the higher layer data signal, and output the header after the payload data through the higher layer data signal. The packet transmitter includes a lower layer transmission block configured to generate a lower layer data signal including the header and the payload data for each packet of the plurality of packets based on the higher layer data signal and a higher layer control signal, output the header prior to the payload data through the lower layer data signal, and output the payload data after the header through the lower layer data signal.

At least one example embodiment provides that the higher layer transmission block is further configured to obtain a transmission message included in the application layer data signal without buffering the transmission message, and output the transmission message as the payload data.

At least one example embodiment provides that the lower layer transmission block is further configured to rearrange a storing order of the payload data and the header received from the higher layer transmission block such that the storing order is different than an order in which the payload data and the header are received, and output the header before outputting the payload data regardless of the order in which the payload data and the header are received.

At least one example embodiment provides that the higher layer transmission block does not include a segmentation buffer configured to segment a transmission message included in the application layer data signal, and the lower layer transmission block includes a buffer configured to rearrange a storing order of the payload data and the header received from the higher layer transmission block such that the storing order is different than an order in which the payload data and the header are received segment the transmission message, and transmit a packet including the payload data and the header.

At least one example embodiment provides that the higher layer transmission block includes a higher layer controller configured to generate each of (i) the higher layer control signal, (ii) a header signal, and (iii) an output selection signal based on the application layer control signal; and an output selector configured to select, in response to the output selection signal, one of (i) the header included in the header signal and (ii) the payload data included in the application layer data signal to be output in the higher layer data signal.

At least one example embodiment provides that the higher layer controller is further configured to determine a transition timing of the output selection signal and a generation timing of the header based on (i) a maximum size of the payload data and (ii) an end-of-message signal included in the application layer control signal, the maximum size being a largest amount of payload data that can be included in a single packet, the end-of-message signal indicating an end timing of each message included in the application layer data signal.

At least one example embodiment provides that the output selector is configured to output the header after the payload data in response to the output selection signal in order to generate the higher layer data signal.

At least one example embodiment provides that the lower layer transmission block includes a lower layer controller configured to generate a write control signal and a read control signal based on the higher layer control signal; and a buffer configured to store the payload data and the header in the higher layer data signal provided from the higher layer transmission block, the storing being in response to the write control signal, and generate the lower layer data signal in response to the read control signal.

At least one example embodiment provides that the buffer is configured to rearrange a storing order of the payload data and the header in response to a write pointer included in the write control signal.

At least one example embodiment provides that the buffer is configured to sequentially output the header and the payload data according to the rearranged storing order in response to a read pointer included in the read control signal to generate the lower layer data signal.

At least one example embodiment provides that the lower layer controller is configured to control a write pointer included in the write control signal such that the payload data input to the buffer is stored according to storing position priorities, the payload data having a lower priority than a priority of the header, and in the controlling the write pointer, the lower layer controller is configured to store the header in a storing position associated with a higher priority than a storing position for storing the payload data regardless of a timing when the header is input to the buffer.

At least one example embodiment provides that the lower layer controller is configured to sequentially increase a read pointer value according to the storing position priorities such that the header and the payload data are output sequentially according to a rearranged storing order, the read pointer being included in the read control signal.

At least one example embodiment provides that the lower layer controller includes a first counter configured to generate a payload pointer indicating a storing position of the payload data input to the buffer, the generating the payload pointer being in response to a transmission valid signal included in the higher layer control signal; a second counter configured to generate a header pointer indicating a storing position of the header input to the buffer, the generating the header pointing being in response to a length signal indicating a size of the payload data currently input to the buffer and an end-of-packet signal included in the higher layer control signal, the end-of-message signal indicating an end timing of each message included in the application layer data signal; and a pointer selector configured to select one of the payload pointer and the header pointer in response to a pointer selection signal, the selected one of the payload pointer and the header pointer being used to generate a write pointer indicating a storing position of one of the payload data and the header.

At least one example embodiment provides that the first counter sequentially increases the payload pointer while the transmission valid signal is activated.

At least one example embodiment provides that the first counter may increase the payload pointer sequentially while the transmission valid signal is activated.

At least one example embodiment provides that the second counter may increase the header pointer according to a size of the payload data currently input to the buffer when the end-of-packet signal is activated.

At least one example embodiment relates to an interface device.

According to at least one example embodiment, an interface device includes a physical layer block; an application layer block; a packet transmitter configured to packetize a transmission message received from the application layer block into transmission packets and output the transmission packets through the physical layer block; and a packet receiver configured to decompose reception packets received through the physical layer block, generate a reception message, and transfer the reception message to the application layer block, where the reception packets are based on the transmission packets. The packet transmitter includes a higher layer transmission block configured to generate a higher layer data signal including payload data and a header for each transmission packet based on an application layer data signal including the transmission message and an application layer control signal. higher layer transmission block is configured to output the payload data prior to the header through the higher layer data signal and output the header after the payload data through the higher layer data signal. The packet transmitter includes a lower layer transmission block configured to generate a lower layer data signal including the header and the payload data for each transmission packet based on the higher layer data signal and a higher layer control signal. The lower layer transmission block is configured to output the header first and output the payload data after the header through the lower layer data signal.

At least one example embodiment provides that the packet transmitter may be compatible with mobile industry processor interface (MIPI) protocol.

At least one example embodiment provides that the lower layer transmission block is configured to rearranges a storing order of the payload data and the header received from the higher layer transmission block and output the header before outputting the payload data regardless of the order in which the payload data and the header are received.

At least one example embodiment provides that the higher layer transmission block does not include a segmentation buffer configured to segment a transmission message included in the application layer data signal; and the lower layer transmission block includes a buffer configured to rearrange a storing order of the payload data and the header received from the higher layer transmission block such that the storing order is different than an order in which the payload data and the header are received, segment the transmission message, and transmit a packet including the payload data and the header.

At least one example embodiment relates to a computing system.

According to at least one example embodiment, a computing system includes a processor, a memory device and an input-output device connected to each other through a bus to exchange information, and at least one of the processor, the memory device and the input-output device comprises a packet transmitter. The packet transmitter includes a higher layer transmission block and a lower layer transmission block. The higher layer transmission block is configured to (i) generate a higher layer data signal, the higher layer data signal including payload data and a header for each packet of a plurality of packets, the payload data and the header for each packet being generated based on an application layer data signal and an application layer control signal, (ii) output the payload data prior to the header through the higher layer data signal, and (iii) output the header after the payload data through the higher layer data signal. The lower layer transmission block configured to (i) generate a lower layer data signal including the header and the payload data for each packet of the plurality of packets based on the higher layer data signal and a higher layer control signal, (ii) output the header prior to the payload data through the lower layer data signal, and (iii) output the payload data after the header through the lower layer data signal.

At least one example embodiment relates to a packet transmitter included in a computing device.

According to an example embodiment, a packet transmitter included in a computing device includes a higher layer transmission block and a lower layer transmission block. The higher layer transmission block not including a first buffer. The first buffer is configured to segment a transmission message included in an application layer data signal. The lower layer transmission block including a second buffer. The second buffer is configured to rearrange a storing order of payload data of the transmission message and a header of the transmission message, the transmission message being received from the higher layer transmission block, and segment the transmission message for retransmission based on an acknowledgment signal indicating a success or failure of the retransmission.

At least one example embodiment provides that the lower layer transmission block includes a lower layer controller configured to generate a write control signal and a read control signal based on the transmission message; and the second buffer is configured to store the payload data of the transmission message and the header of the transmission message in response to the write control signal; and the second buffer is configured to generate the lower layer data signal in response to the read control signal.

At least one example embodiment provides that the buffer is configured to sequentially output the header and the payload data according to the rearranged storing order in response to a read pointer included in the read control signal.

At least one example embodiment provides that the lower layer controller is configured to control a write pointer included in the write control signal such that the payload data input to the buffer is stored according to storing position priorities, the payload data having a lower priority than a priority of the header, and in the controlling the write pointer, the lower layer controller is configured to store the header in a storing position associated with a higher priority than a storing position for storing the payload data regardless of a timing when the header is input to the buffer.

At least one example embodiment provides that the lower layer controller is configured to sequentially increase a read pointer value according to the storing position priorities such that the header and the payload data are output sequentially according to a rearranged storing order, the read pointer being included in the read control signal.

As will be appreciated, the systems and methods according to the example embodiments provide several advantages. For example, the packet transmitter, the interface device, and the system including the packet transmitter according to the various example embodiments as disclosed herein may reduce occupation area by performing data segmentation and data retransmission using a buffer for the data retransmission without requiring another buffer for the data segmentation. Additionally, the packet transmitter, the interface device, and the system including the packet transmitter according to the various example embodiments disclosed herein may reduce latency in packet generation by rearranging the storing order of the header and the payload data and outputting the header and the payload data according to the rearranged storing order.

BRIEF DESCRIPTION OF THE DRAWINGS

Example embodiments of the inventive concept will be more clearly understood from the following detailed description taken in conjunction with the accompanying drawings.

FIG. 20 is a block diagram illustrating an example of an interface used in a computing system of FIG. 19 according to various example embodiments.

DETAILED DESCRIPTION OF THE EMBODIMENTS

Figure 1:
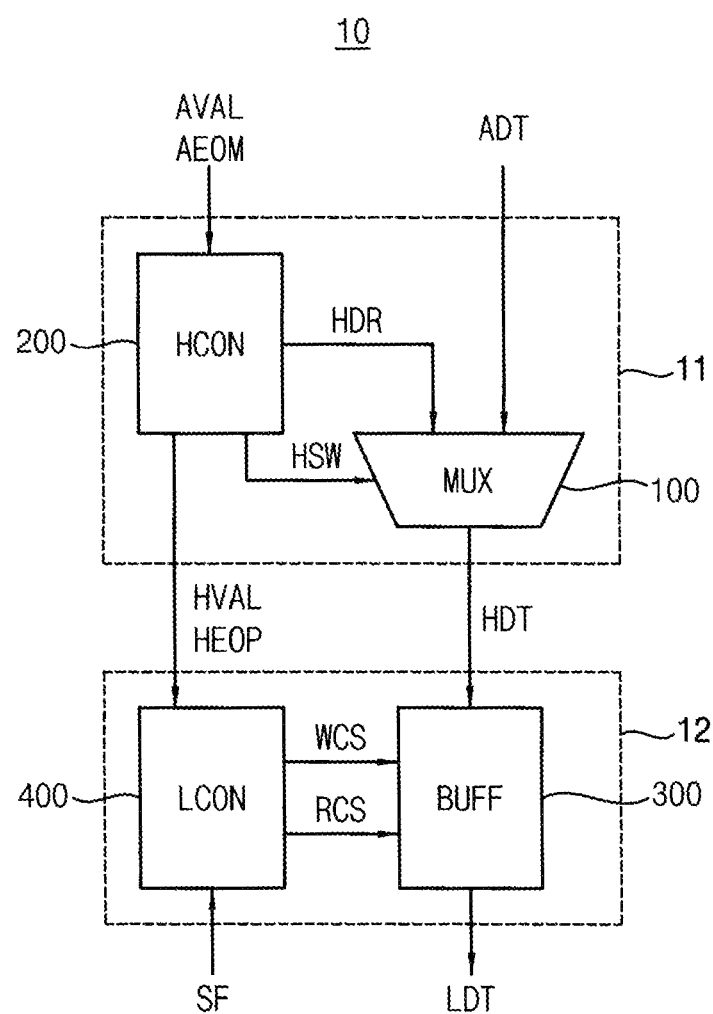
FIG. 1 is a block diagram illustrating a packet transmitter according to various example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a packet transmitter according to example embodiments.

Referring to FIG. 1, a packet transmitter 10 includes a higher layer transmission block 11 and a lower layer transmission block 12.

In the present disclosure, the higher layer transmission block 11 represents a portion or a part that is compatible with relatively more abstract protocol than the lower layer transmission block 12, while the lower layer transmission block 12 represents a portion or a part that is compatible with relatively less abstract protocol than the higher layer transmission block 11. For example, the higher layer transmission block 11 may be a transaction layer and the lower layer transmission block 12 may be a data link layer according to the mobile industry processor interface (MIPI) protocol. Example embodiments disclosed herein may be applied to any device and/or system that synthesizes data (e.g., payload data) and/or information on the data (e.g., a header) to transmit a protocol data unit (PDU) (e.g., a packet and/or a message) regardless of terminology and/or protocols that define one or more of the layers, the protocol data units, etc.

The higher layer transmission block 11 generates a higher layer data signal HDT including payload data and a header with respect to each packet based on an application layer data signal ADT and an application layer control signal. The application layer control signal may include a transmission valid signal AVAL, an end-of-message signal, etc. The transmission valid signal AVAL may indicate whether the data currently input to the higher layer transmission block 11 is valid data or invalid data. The end-of-message signal AEOM may indicate an end timing of each message included in the application layer data signal ADT.

As will be described with reference to FIGS. 2 and 4, the higher layer transmission block 11 outputs the payload data first and outputs the header after the payload data through the higher layer data signal HDT.

The lower layer transmission block 12 generates a lower layer data signal LDT including the header and the payload data with respect to each packet based on the higher layer data signal HDT and a higher layer control signal. The higher layer control signal may include a transmission valid signal HVAL, an end-of-packet signal HEOP, etc. The transmission valid signal HVAL may indicate whether the data currently input to the lower layer transmission block 12 are valid or invalid. The end-of-packet signal HEOP may indicate an end timing of each packet included in the higher layer data signal HDT.

As will be described with reference to FIGS. 3 and 5, The lower layer transmission block 12 outputs the header first and output the payload data after the header through the lower layer data signal LDT.

The higher layer transmission block may include an output selector MUX 100 (hereinafter "output selector 100") and a higher layer controller HCON 200 (hereinafter "higher later controller 200"). The higher layer controller 200 may generate the higher layer control signal HVAL and HEOP, a header signal HDR and an output selection signal HSW based on the application layer control signal AVAL and AEOM. The output selector 100 may select one of the header included in the header signal HDR and the payload data included in the application layer data signal ADT in response to the output selection signal HSW to output the higher layer data signal HDT.

According to various embodiments, the higher layer transmission block 11 may pass a transmission message included in the application layer data signal ADT without buffering the transmission message, and output the transmission message as the payload data through the higher layer data signal HDT. According to various embodiments, the payload data may be provided to the lower layer transmission block 12 before the header is generated by the higher layer controller 200, and thus, the latency until outputting the final packet may be reduced.

The lower layer transmission block 12 includes a buffer BUFF 300 (hereinafter "buffer 300") and a lower layer controller LCON 400 (hereinafter "lower layer controller 400"). The lower layer controller 400 may generate a write control signal WCS and a read control signal RCS based on the higher layer control signal HVAL and/or HEOP. The buffer 300 may store the payload data and the header provided in the higher layer data signal HDT from the higher layer transmission block 11 in response to the write control signal WCS. The buffer 300 may generate the lower layer data signal LDT in response to the read control signal RCS.

As will be further described later, the lower layer transmission block 12 may rearrange a storing order of the payload data and the header received from the higher layer transmission block 11, using the buffer 300 and the write control signal WCS. The lower layer transmission block 12 may output the header first and output the payload data after the header, according to the rearranged storing data, in response to the read control signal RCS.

The conventional packet transmitters include a buffer for data segmentation in the higher layer and a buffer for data retransmission in the lower layer. In conventional packet transmitters, the higher and lower layers operate independently and use the respective buffers, thereby increasing latency, occupation area and power consumption of the packet transmitter.

As described with reference to FIG. 1, the higher layer transmission block 11 does not include a segmentation buffer for segmenting the transmission message included in the application layer data signal ADT. The lower layer transmission block 12 includes the output buffer 300 that rearranges the storing order of the payload data and the header received from the higher layer transmission block 11 and performs segmentation of the transmission message and packet retransmission. The lower layer transmission block 12 may perform the data retransmission by controlling the read control signal RCS based on a signal SF indicating success of fail of the packet transmission. The signal SF may be referred to as a failure acknowledgement signal and the like.

As such, the packet transmitter 10 according to various example embodiments may reduce occupation area by performing data segmentation and data retransmission using the buffer 300 for the data retransmission without requiring another buffer for the data segmentation. In addition, the packet transmitter 10 according to various example embodiments may reduce latency in packet generation by rearranging the storing order of the header and the payload data, and outputting the header and the payload data according to the rearranged storing order.

Hereinafter, operations of the packet transmitter 10 are described with reference to FIGS. 2 and 3 according to various example embodiments.

Figure 2:
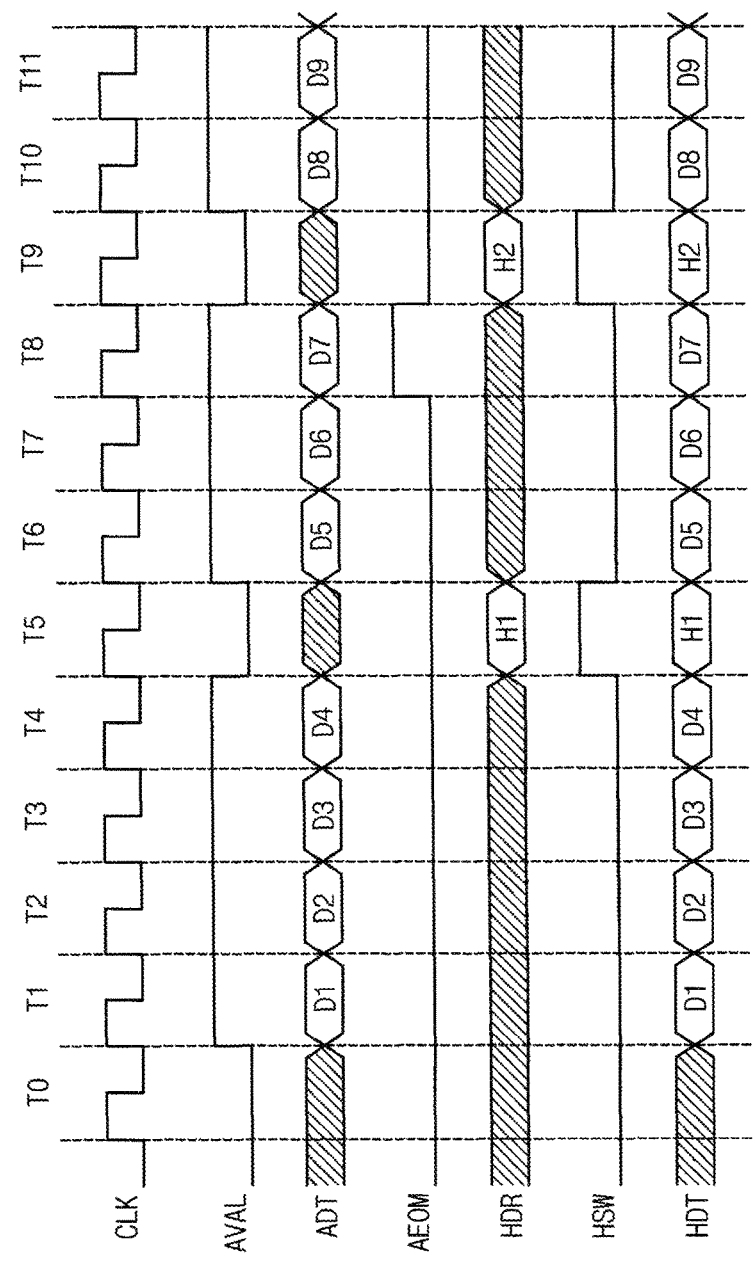
FIG. 2 is a timing diagram illustrating an example operation of a higher layer transmission block included in the packet transmitter of FIG. 1 according to various example embodiments.
Figure 3:
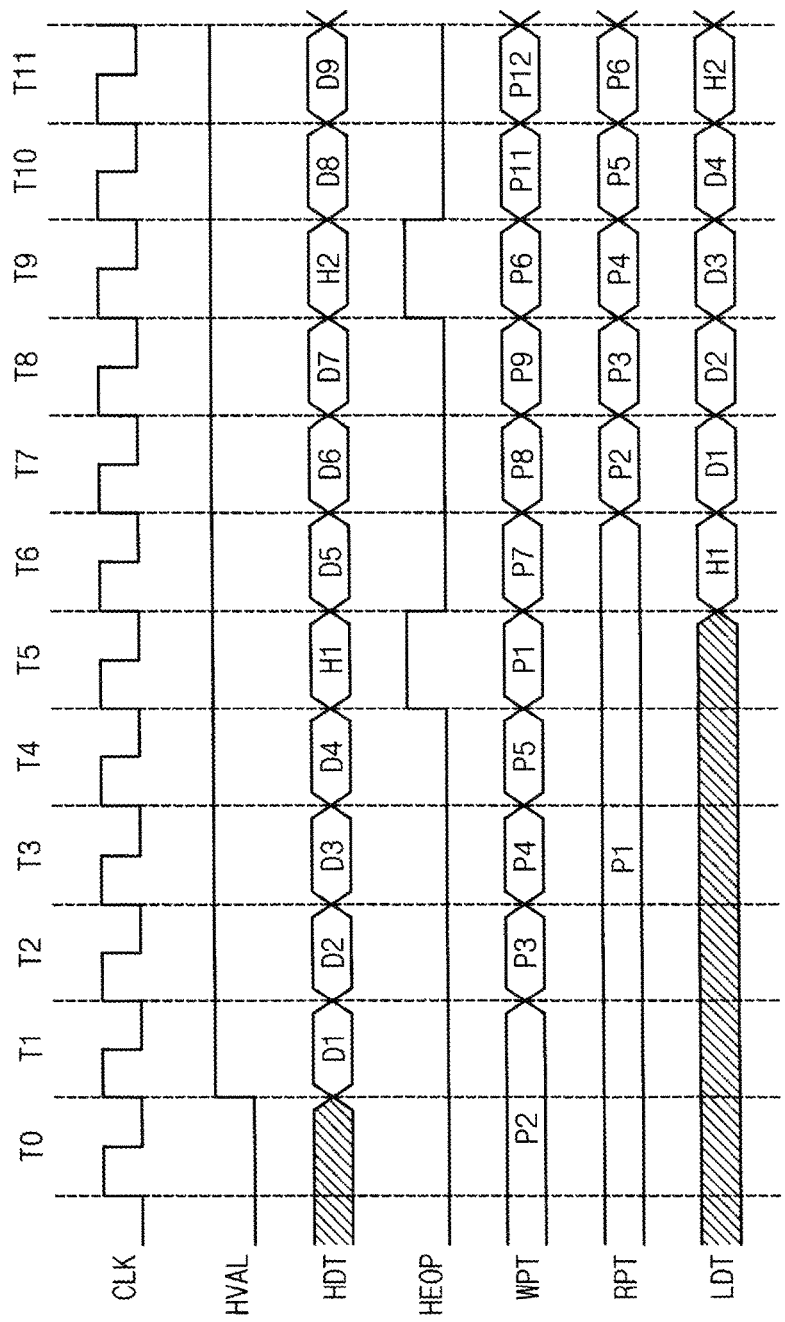
FIG. 3 is a timing diagram illustrating an example operation of a lower layer transmission block included in the packet transmitter of FIG. 1 according to various example embodiments.

FIG. 2 is a timing diagram illustrating an example operation of a higher layer transmission block included in the packet transmitter of FIG. 1 according to various example embodiments, and FIG. 3 is a timing diagram illustrating an example operation of a lower layer transmission block included in the packet transmitter of FIG. 1 according to various example embodiments.

Each of unit of data D1-D9 (or alternatively, "data unit") illustrated in FIGS. 2 and 3 may include multiple or a plurality of bits. According to various embodiments, the multiple bits of each data unit may be transferred in parallel per clock cycle (as represented by "CLK" in FIG. 2) until the multiple bits are serialized into a final packet. For example, each data unit may be byte data and the number of the bits in each data unit may be eight. By way of another example, each data unit may be word data and the number of the bits in each data unit may be sixteen. According to various example embodiments, the data units may have a variable length such that at least one data unit has a different number of bits than at least one other data unit.

The maximum size MXS of the payload data that can be included in one packet may be defined by the maximum number of the data unit that can be included in one packet. In other words, the maximum bit number in one packet may be represented as the maximum size MXS multiplied by the bit number of each data unit. Hereinafter, the maximum size MXS is assumed to be four as illustrated in FIGS. 2 and 3, for convenience of illustration and description. The bit number of each data unit and the maximum size MXS may be changed variously.

The application layer data signal ADT may include a message including one or more data units. If the size of the message is greater than the maximum size MXS, the message is segmented into a plurality of payload data and/or a plurality of data units. For example, as illustrated in FIG. 2, when the message includes the seven bits D1-D7 and the maximum size MXS per data unit is four bits, the message may be segmented into first payload data D1-D4 having the maximum size MXS of 4 bits and second payload data D5-D7 having a size of three bits.

Referring to FIGS. 1 and 2, the higher layer controller HCON 200 in the higher layer transmission block 11 may determine a transition timing of the output selection signal HSW and a generation timing of the headers H1 and H2 based on the maximum size MXS of the payload data that can be included in one packet and the end-of-message signal AEOM.

As illustrated in FIG. 2, the higher layer controller 200 may recognize that the message has been segmented because the end-of-message signal AEOM is not activated during time period T4 corresponding to the maximum size MXS.

Thus, the higher layer controller 200 may output the first header H1 through the header signal HDR and activate the output selection signal HSW from a first logic level (e.g., a logic low level) to a second logic level (e.g., a logic high level), during time period T5.

The higher layer controller 200 may recognize that the message is completed when the end-of-message signal AEOM is activated during time period T8. Thus, the higher layer controller 200 may output the second header H2 through the header signal HDR and activate the output selection signal HSW from the logic low level to the logic high level during time period T9.

During time periods T1-T4, the transmission valid signal AVAL transitions to the logic high level and the output selector 100 in the higher layer transmission block 11 receives the first payload data D1-D4 having the maximum size of four through the application layer data signal ADT. The output selection signal HSW has the logic low level during time periods T1-T4, and the output selector 100 selects and outputs the first payload data D1-D4 included in the application layer data signal ADT in response to the logic low level of the output selection signal HSW. As such, that output selector 100 may not buffer the first payload data D1-D4, and pass and output the first payload data D1-D4 through the higher layer data signal HDT.

During time period T5, the output selection signal HSW has the logic high level, and the output selector 100 selects and outputs the first header H1 included in the header signal HDR in response to the logic high level of the output selection signal HSW.

During time periods T6-T8, the transmission valid signal AVAL transitions to the logic high level again and the output selector 100 in the higher layer transmission block 11 receives the second payload data D5-D7 having the size of three smaller than the maximum size through the application layer data signal ADT. The output selection signal HSW has the logic low level during time periods T6-T8, and the output selector 100 selects and outputs the second payload data D5-D7 included in the application layer data signal ADT in response to the logic low level of the output selection signal HSW. As such, that output selector 100 may not buffer the second payload data D5-D7, and pass and output the second payload data D5~D7 through the higher layer data signal HDT.

During time period T9, the output selection signal HSW has the logic high level, and the output selector 100 selects and outputs the second header H2 included in the header signal HDR in response to the logic high level of the output selection signal HSW.

As such, the output selector 100 may generate the higher layer data signal HDT by outputting the payload data first and outputting the header after the payload data in response to the output selection signal HSW from the higher layer controller 200.

Referring to FIGS. 1 and 3, during time periods T1-T11, the transmission valid signal HVAL is activated to the logic high level, the payload data D1-D9 and the headers H1 and H2 are transferred through the higher layer data signal HDT from the higher layer transmission block 11 to lower layer transmission block 12 according to the above-described outputting order of the higher layer transmission block 11. During time periods T5 and T9, the end-of-packet signal HEOP is activated to the logic high level and the headers H1 and H2 are transferred through the header signal HDR.

The lower layer controller 400 in the lower layer transmission block 12 may control a write pointer WPT included in the write control signal WCS to rearrange the storing order of the payload data and/or the header. For convenience of description, it is assumed that a smaller value of the write pointer WPT indicates the storing position of the higher priority in the buffer 300. For example, P1 indicates the storing position of the highest priority in the buffer 300 and Pk+1 indicates the storing position of a lower priority than Pk in FIG. 3.

As illustrated in FIG. 3, the first payload data D1-D4 input first to the buffer 300 may be stored in the storing positions P2-P5 having lower priorities in the buffer 300 and the first header H1 input to the buffer 300 after the first payload data D1-D4 may be stored in the buffer 300 at the storing position P1 having the highest priority. Also, the second payload data D5-D7 input first to the buffer 300 may be stored in the buffer 300 at the storing positions P7-P9 having the lower priorities, and the second header H2 input to the buffer 300 after the second payload data D5-D7 may be stored in the buffer 300 at the storing position P6, which has a higher priority than the storing positions P7-P9 and a lower priority than the storing position P1.

Accordingly, the buffer 300 may rearrange the storing order of the payload data and the header in response to the write pointer WPT included in the write control signal WCS. The control of the write pointer WPT will be further described with reference to FIGS. 7 and 8.

The lower layer controller 400 in the lower layer transmission block 12 may increase a read pointer RPT sequentially according to the priorities of the storing positions in the buffer 300 such that the header and the payload data are output sequentially according to the rearranged storing order. The read pointer RPT as shown in FIG. 3 is included in the read control signal RCS as shown in FIG. 1.

As illustrated in FIG. 3, the read pointer RPT may be initialized to indicate the storing position P1 of the highest priority and the read pointer RPT may be increased sequentially. As a result, the first header H1 may be output first and the first payload data D1-D4 are output after the first header H1.

Accordingly, the buffer 300 may output the header and the payload data sequentially according to the rearranged storing order in response to the read pointer RPT included in the read control signal RCS to generate the lower layer data signal LDT.

Figure 4:
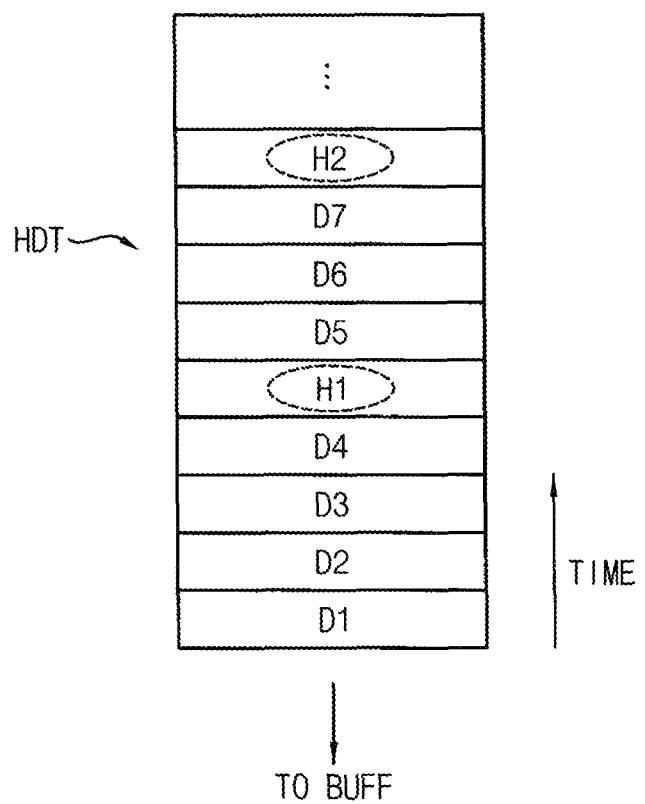
FIG. 4 is a diagram illustrating an inputting order of payload data and header into a buffer according to various example embodiments.
Figure 5:
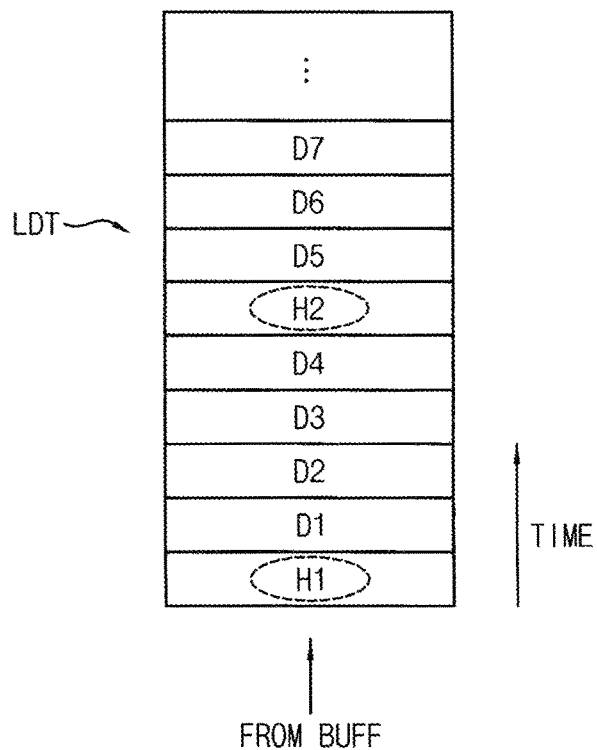
FIG. 5 is a diagram illustrating an outputting order of payload data and header from a buffer according to various example embodiments.

FIG. 4 is a diagram illustrating an inputting order of payload data and header into a buffer according to various example embodiments, and FIG. 5 is a diagram illustrating an outputting order of payload data and header from a buffer according to various example embodiments.

Referring to FIG. 4, through the higher layer data signal HDT, the first payload data D1-D4, the first header H1, the second payload data D5-D7 and the second header H2 are sequentially input to the buffer 300. The transmission message may be segmented and spread in a plurality of packets. To recover the entire transmission message from the packets, the receiver device has to receive the header earlier than the payload data with respect to each packet.

Referring to FIG. 5, through the lower layer data signal LDT, the first header H1, the first payload data D1-D4, the second header H2 and the second payload data D5-D7 are output and sequentially transferred to the receiver device.

As such, the header may be first and the payload data may be output after the header with respect to each packet from the buffer 300 by rearranging the storing order in the buffer 300.

Figure 6:
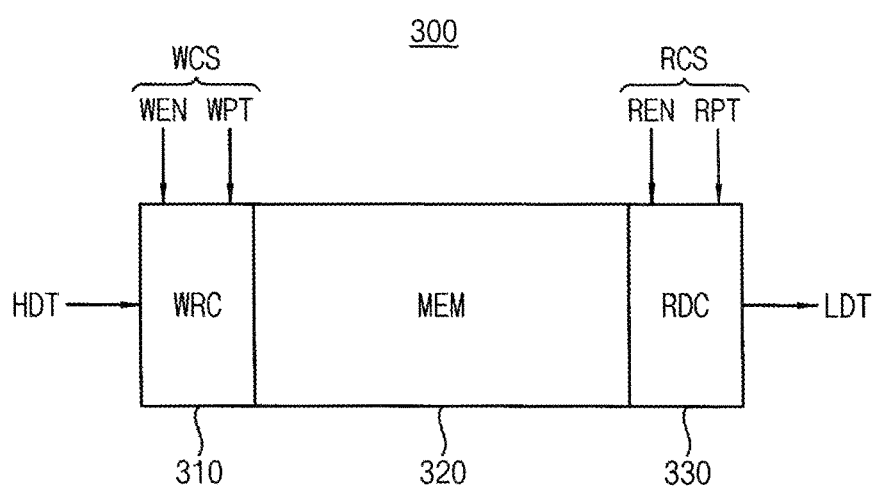
FIG. 6 is a diagram illustrating an example embodiment of a buffer included in the packet transmitter of FIG. 1 according to various example embodiments.

FIG. 6 is a diagram illustrating an example embodiment of a buffer included in the packet transmitter of FIG. 1 according to various example embodiments.

Referring to FIG. 6, a buffer 300 may include a write controller WRC 310 (hereinafter "write controller 310"), a memory region MEM 320 (hereinafter "memory region 320") and a read controller RDC 330 (hereinafter "read controller 330").

The storing space of the buffer 300, that is, the storing positions of the memory region 320 may be mapped to the values of the write pointer WPT and the read pointer RPT, respectively. As described above, it is assumed that the smaller value of the write and read pointers WPT and RPT indicates a storing position of a higher priority in the memory region 330 than storing positions having larger values. Thus, P1 indicates the storing position of the highest priority in the memory region and Pk+1 indicates the storing position having a lower priority than Pk as described with reference to FIG. 3.

The write controller 310 may store the payload data and the header included in the higher layer data signal HDT in the corresponding storing positions based on the write control signal WCS. The write control signal WCS may include a write enable signal WEN controlling timings of the write operation and the write pointer WPT indicating the storing position of the payload data and/or the header input to the buffer 300.

The read controller 330 may read out the header and the payload data from the corresponding storing positions based on the read control signal RCS to generate the lower layer data signal LDT. The read control signal RCS may include a read enable signal controlling timings of the read operation and the read pointer RPT indicating the storing position from which the payload data or the header is read out.

The buffer 300 may rearrange the storing order of the payload data and the header provided through the higher layer data signal HDT in response to the write pointer WPT included in the write control signal WCS. In addition, the buffer 300 may output the header and the payload data sequentially according to the rearranged storing order in response to the read pointer RPT included in the read control signal RCS to generate the lower layer data signal LDT.

Figure 7:
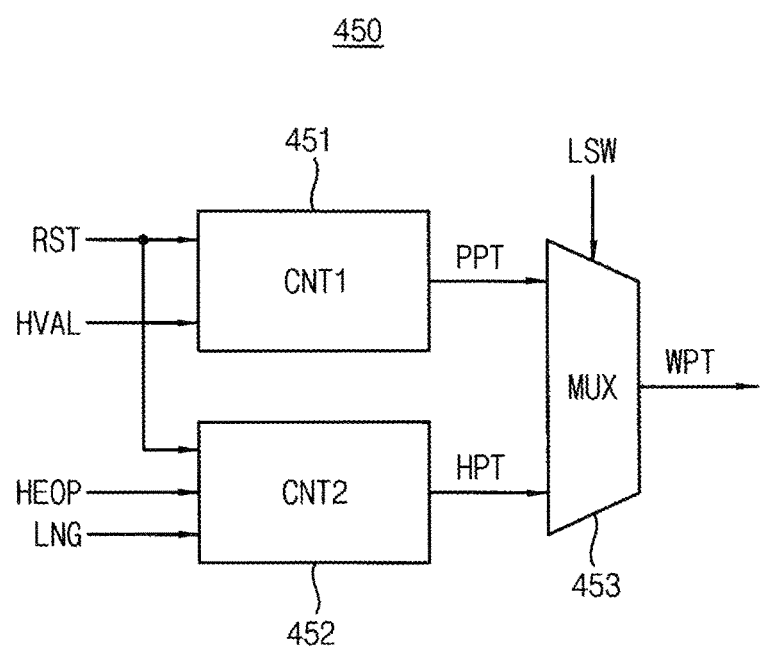
FIG. 7 is a diagram illustrating an example embodiment of a write pointer generator included in the packet transmitter of FIG. 1 according to various example embodiments.
Figure 8:
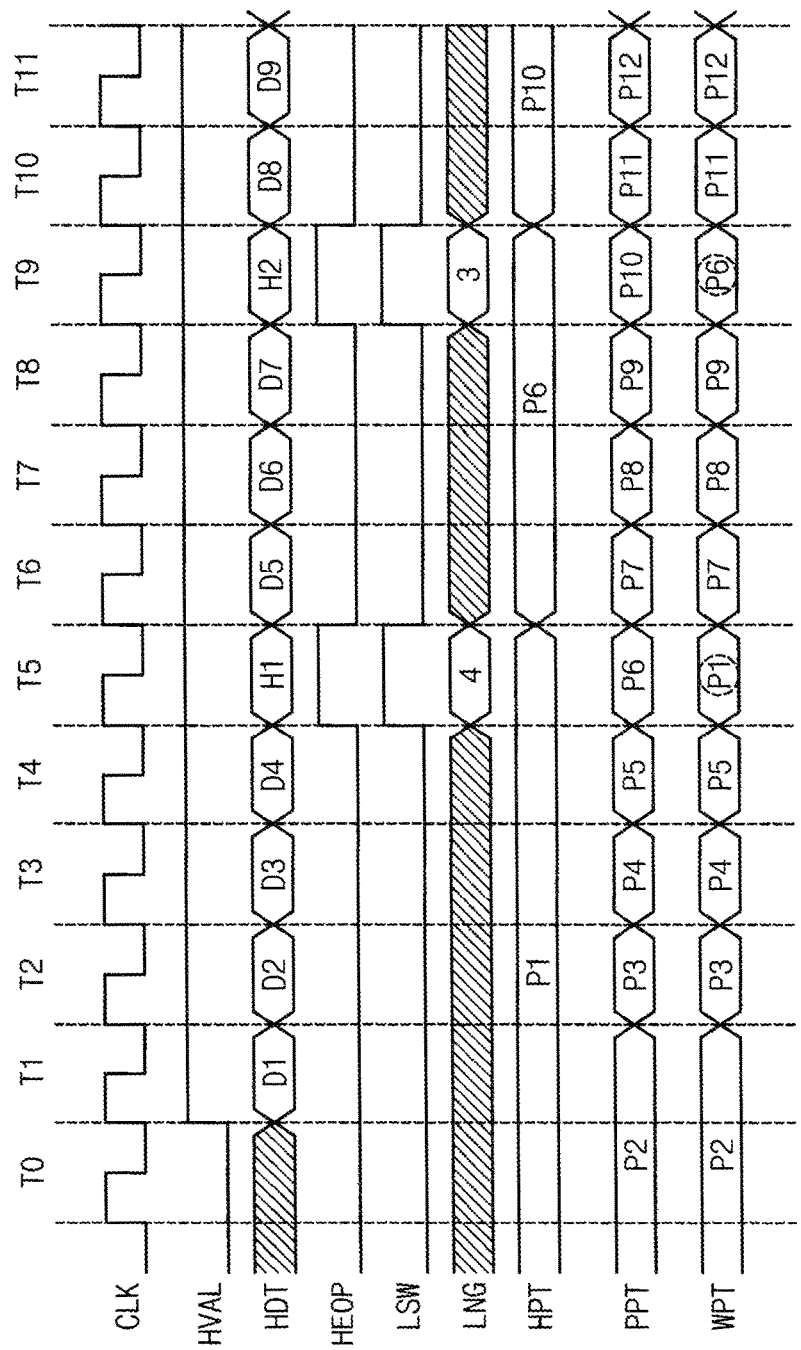
FIG. 8 is a timing diagram illustrating an example operation of the write pointer generator of FIG. 7 according to various example embodiments.

FIG. 7 is a diagram illustrating an example embodiment of a write pointer generator included in the packet transmitter of FIG. 1 according to various example embodiments, and FIG. 8 is a timing diagram illustrating an example operation of the write pointer generator of FIG. 7 according to various example embodiments. According to various embodiments, the write pointer generator 450 of FIG. 7 may be included in the lower layer transmission block 12 in FIG. 1.

Referring to FIG. 7, the write pointer generator 450 may include a first counter CNT1 451 (hereinafter "first counter 451"), a second counter CNT2 452 (hereinafter "second counter 452"), and a pointer selector MUX 453 (hereinafter "pointer selector 453").

The first counter 451 may generate a payload pointer PPT indicating a storing position of the payload data input to the buffer 300 in response to a transmission valid signal HVAL included in the higher layer control signal. The second counter 452 may generate a header pointer HPT indicating a storing position of the header input to the buffer 300 in response to a length signal LNG indicating a size of the payload data currently input to the buffer 300 and an end-of-packet signal HEOP included in the higher layer control signal. The first counter 451 and the second counter 452 may be initialized in response to a reset signal RST.

The pointer selector 453 may select one of the payload pointer PPT and the header pointer HPT in response to a pointer selection signal LSW to generate a write pointer WPT indicating a storing position of the payload data or the header input to the buffer 300.

FIG. 8 illustrates an example operation of the write pointer generator 450 to rearrange the storing position with respect to the higher layer data signal HDT as illustrated in FIG. 3 according to various example embodiments. The description repeated with regard to FIG. 3 is omitted for the sake of brevity.

Referring to FIGS. 7 and 8, the first counter 451 may increase the payload pointer PPT sequentially while the transmission valid signal HVAL is activated, for example, to the logic high level. The payload pointer PPT may be initialized to indicate storing position P2, which is a storing position having a priority one level lower than the storing position of the highest priority P1, and the payload pointer PPT may be increased sequentially from P2 to P3, P4, and so on, while the transmission valid signal HVAL is activated.

The second counter 452 may increase the header pointer HPT by one plus the size of the payload data currently input to the buffer 300, when the end-of-packet signal HEOP is activated, for example, to the logic high level. During time period T5 when the end-of-packet signal HEOP is activated to a logic high level, the size of the first payload data D1-D4 currently input to the buffer 300 is four, and thus, the header pointer HPT may be increased by 1+4, that is, from P1 to P6. During time period T9 when the end-of-packet signal HEOP is activated to a logic high level, the size of the second payload data D5-D7 currently input to the buffer 300 is three, and thus, the header pointer HPT may be increased by 1+3, that is, from P6 to P10.

The pointer selector 453 may select one of the payload pointer PPT and the header pointer HPT in response to the pointer selection signal LSW to generate the write pointer WPT. For example, the pointer selector 453 may select and output the payload pointer PPT as the write pointer WPT when the pointer selection signal LSW is deactivated to the logic low level and the pointer selector 453 may select and output the header pointer HPT as the write pointer WPT when the pointer selection signal LSW is activated to the logic high level. The pointer selection signal LSW may be generated in synchronization with the end-of-packet signal HEOP or the end-of-signal HEOP itself may be used as the pointer selection signal LSW.

As a result, the write point generator 450 included in the lower layer controller 400 may control the write pointer WPT such that the payload data (e.g., D1-D4) input first to the buffer 300 is stored in the storing position (e.g., P2-P5) of the lower priority in the buffer 300 and the header (e.g., H1) input to the buffer 300 after the payload data is stored in the storing position (e.g., P1) of the higher priority in the buffer 300 to rearrange the storing order of the payload data and the header.

FIGS. 9, 10, 11 and 12 are diagrams for describing a rearrangement operation of the packet transmitter according to various example embodiments. FIGS. 9, 10, 11 and 12 illustrates buffer states 321, 322, 323 and 324, respectively, which are changed over a period of time.

Figure 9:
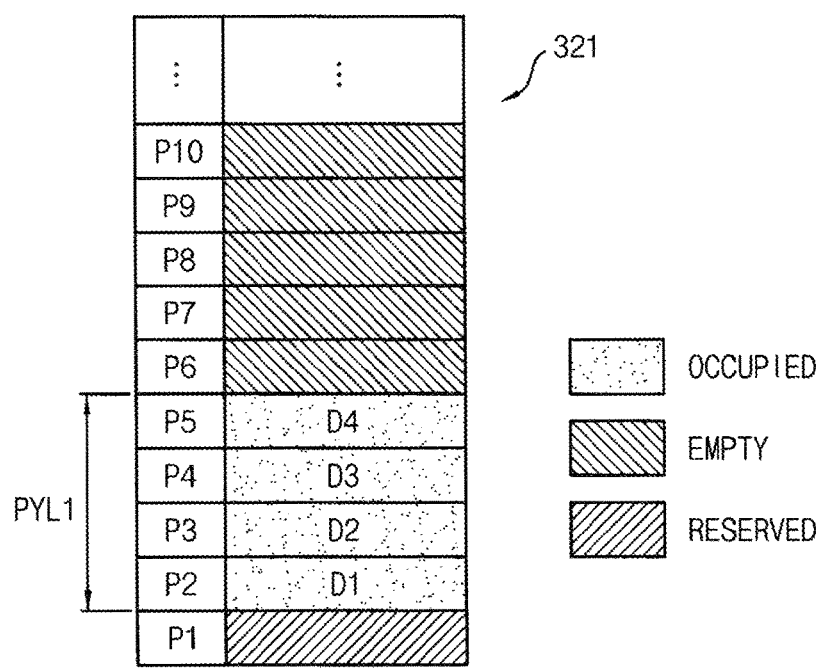
FIGS. 9, 10, 11 and 12 are diagrams for describing a rearrangement operation of the packet transmitter according to various example embodiments.

Referring to FIG. 9, the first payload data PYL1 or D1-D4 of the first packet PCK1 are stored in the storing positions P2-P5 having relatively lower priorities. The storing position P1 of a relatively higher priority is reserved for the first header H1 of the first packet PCK1 that is input to the buffer after the first payload data D1-D4.

Figure 10:
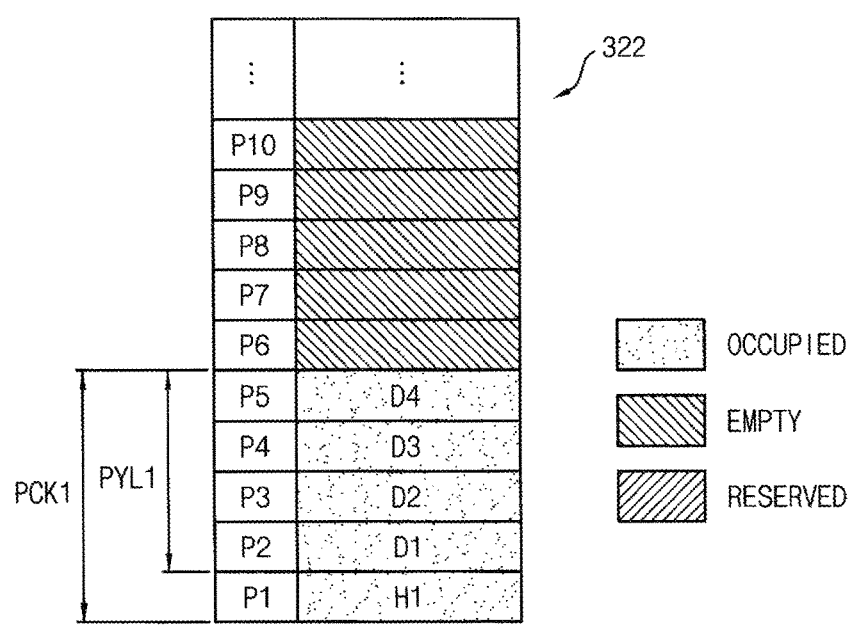

Referring to FIG. 10, the first header H1 input to the buffer after the first payload data D1-D4 is stored in the storing position P1 of a relatively higher priority. As a result, the storing order of the first payload data D1-D4 and the first header H1 is rearranged, and thus, the first header H1 and the first payload data D1-D4 are stored sequentially from the storing position P2 to the storing position P5 according to the sequential priorities.

Figure 11:
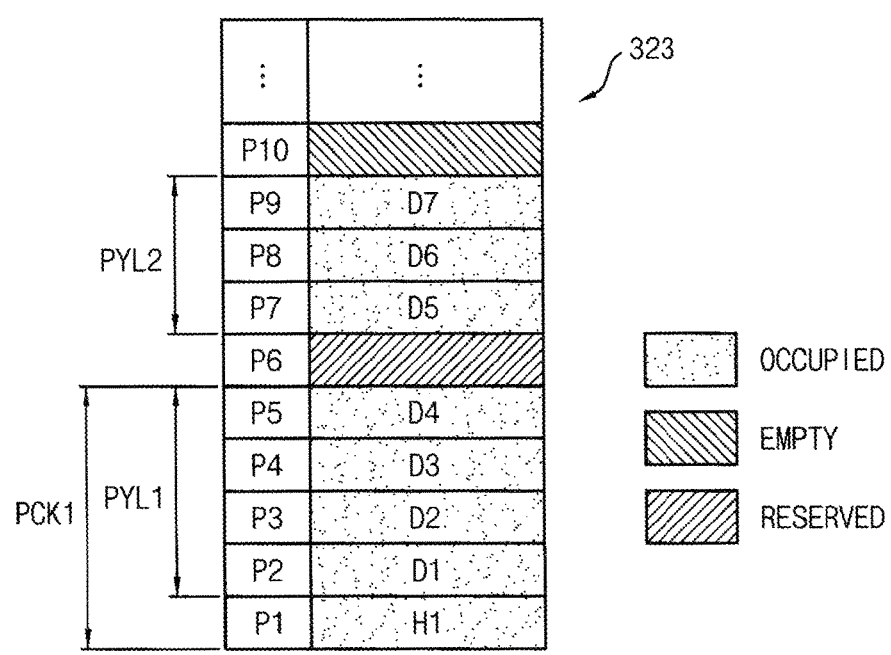

Referring to FIG. 11, the second payload data PYL2 or D5-D7 of the second packet PCK2 are stored in the storing positions P7-P9 having relatively low priorities. The storing position P6 having a higher priority than the priority for storing positions P7-P9 is reserved for the second header H2 of the second packet PCK2 that is input to the buffer after the second payload data D5-D7.

Figure 12:
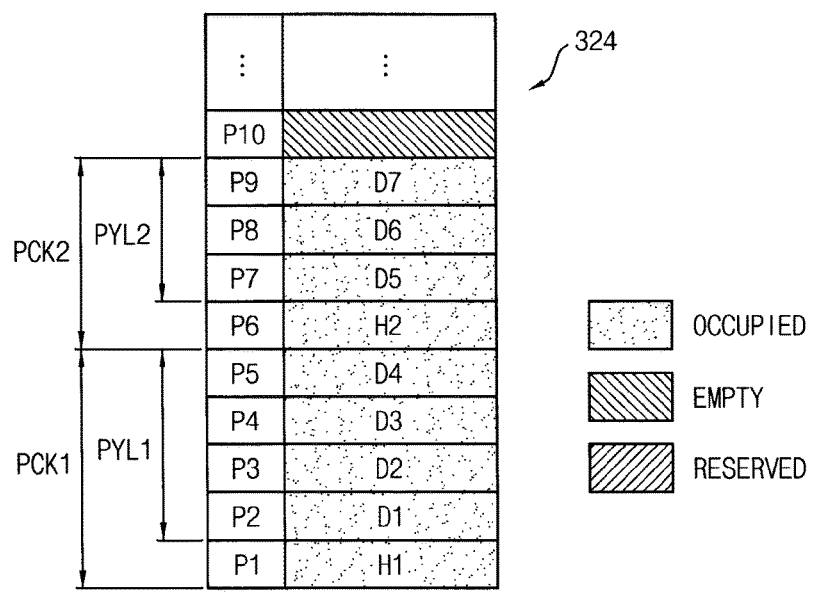

Referring to FIG. 12, the second header H2 input to the buffer after the second payload data D5-D7 is stored in the storing position P6 having a higher priority than the priority for storing positions P7-P9. As a result, the storing order of the second payload data D5-D7 and the second header H2 is rearranged, and thus, the second header H2 and the second payload data D5-D7 are stored sequentially from the storing position P6 to the storing position P9 according to the sequential priorities.

The read pointer RPT may be increased sequentially starting from P1, such that the header may be output first and the payload data may be output after the header with respect to each packet, according to the rearranged storing order.

Figure 13:
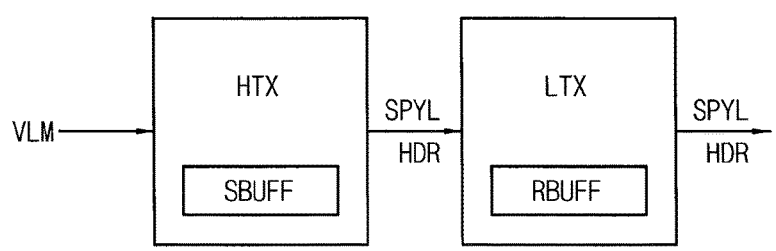
FIGS. 13 and 14 are diagrams illustrating a configuration and an operation of a packet transmitter that performs data segmentation and data retransmission independently using respective buffers according to various example embodiments.
Figure 14:
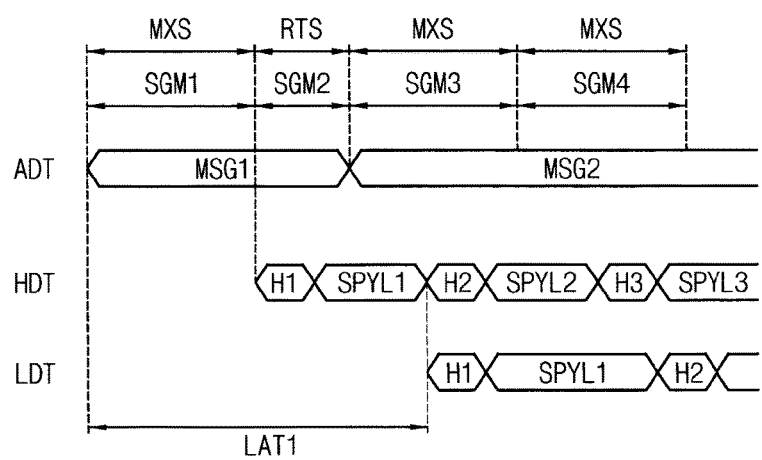

FIGS. 13 and 14 are diagrams illustrating a configuration and an operation of a packet transmitter that performs data segmentation and data retransmission independently using respective buffers.

Referring to FIG. 13, a packet transmitter 20 may include a higher layer transmission block HTX and a lower layer transmission block LTX. The higher layer transmission block HTX includes a segmentation buffer SBUFF for segmenting a variable length message VLM and outputs segmented payload data SPYL and a header HDR. The lower layer transmission block LTX includes a retransmission buffer RBUFF for retransmitting the header HDR and the payload data SPYL in case of a transfer failure. The header HDR and the payload data SPYL may be output from the lower layer transmission block LTX in a same or different order than an order that the header HDR and the payload data SPYL are input into the lower layer transmission block LTX.

Referring to FIG. 14, the variable length messages MSG1 and MSG2 included in the application layer data signal ADT may be segmented into one or more segments.

For example, the first message MSG1 may be segmented into one segment SGM1 having a maximum size MXS and another segment SGM2 having a rest size RTS smaller than the maximum size MXS. The second message MSG2 may be segmented into a plurality of segments including at least two segments SGM3 and SGM4 having the maximum size MXS. Each segment SGMi (where i=1, 2, 3, . . . ) corresponds to each segmented payload data SPYLi.

The variable length messages MSG1 and MSG2 are stored in the segmentation buffer SBUFF, and the higher layer transmission block HTX divide the variable length messages MSG1 and MSG2 using the stored data. When the header is generated with respect to each packet, the header and the payload data are sequentially output through the higher layer data signal HDT. The generated packets are stored again in the retransmission buffer RBUFF of the lower layer transmission block LTX and output through the lower layer data signal LDT.

Figure 15:
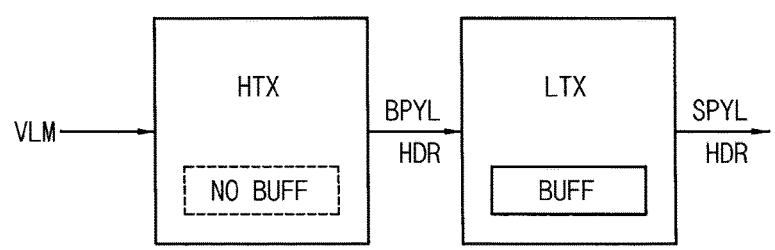
FIGS. 15 and 16 are diagrams illustrating a configuration and an operation of a packet transmitter that performs data segmentation and data retransmission using one buffer according to various example embodiments.
Figure 16:
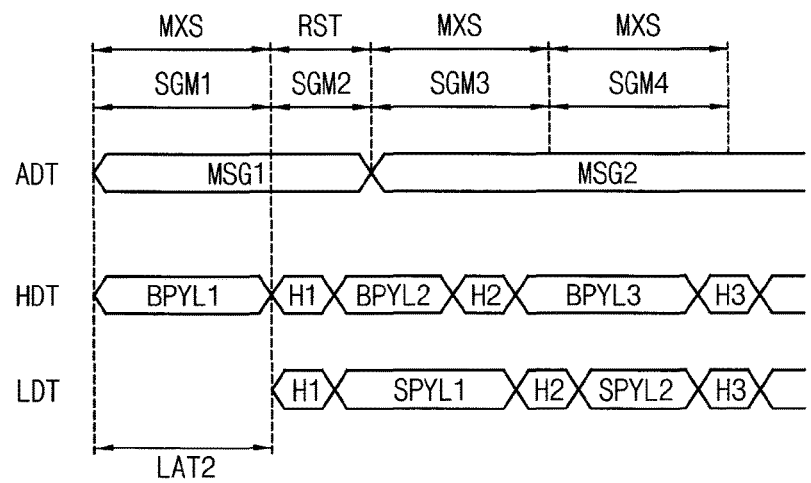

As such, the packet transmitter performs 20 performs the data segmentation and the data retransmission independently using the respective buffers SBUFF and RBUFF, and thus, the packet transmitter 20 has a relatively-high latency LAT1 in comparison to the latency LAT1 described with regard to FIGS. 15 and 16.

FIGS. 15 and 16 are diagrams illustrating a configuration and an operation of a packet transmitter that performs data segmentation and data retransmission using one buffer according to example embodiments.

Referring to FIG. 15, a packet transmitter 30 may include a higher layer transmission block HTX and a lower layer transmission block LTX. The higher layer transmission block HTX does not include the segmentation buffer SBUFF as described with regard to FIGS. 13 and 14. The higher layer transmission block HTX passes a variable length message VLM without buffering and outputs bypassed payload data BPYL and a header HDR. The lower layer transmission block LTX includes a buffer BUFF for performing the segmentation of the bypassed payload data BPYL and the packet retransmission in case of transfer fail.

Referring to FIG. 16, the variable length messages MSG1 and MSG2 included in the application layer data signal ADT may be segmented into one or more segments.

For example, the first message MSG1 may be segmented into one segment SGM1 having a maximum size MXS and another segment SGM2 having a rest size RTS smaller than the maximum size MXS. The second message MSG2 may be segmented into a plurality of segments including at least two segments SGM3 and SGM4 having the maximum size MXS. Each segment SGMi (i=1, 2, 3, . . . ) corresponds to each segmented payload data SPYLi.

The higher layer transmission block HTX passes the variable length messages MSG1 and MSG2 without buffering. Through the higher layer data signal HDT, the bypassed payload data BPYLi (i=1, 2, 3, . . . ) may be output before the header Hi is generated with respect to each packet. The bypassed payload data BPYLi and the header Hi are rearranged and stored in the buffer BUFF of the lower layer transmission block LTX, and output as the lower layer data signal LDT.

As such, the packet transmitter performs 30 may perform the data segmentation and the data retransmission integrally using the one buffer BUFF 300, and thus, the packet transmitter 30 has a relatively-low latency LAT2 in comparison to the latency LAT1 described with regard to FIGS. 13 and 14.

Figure 17:
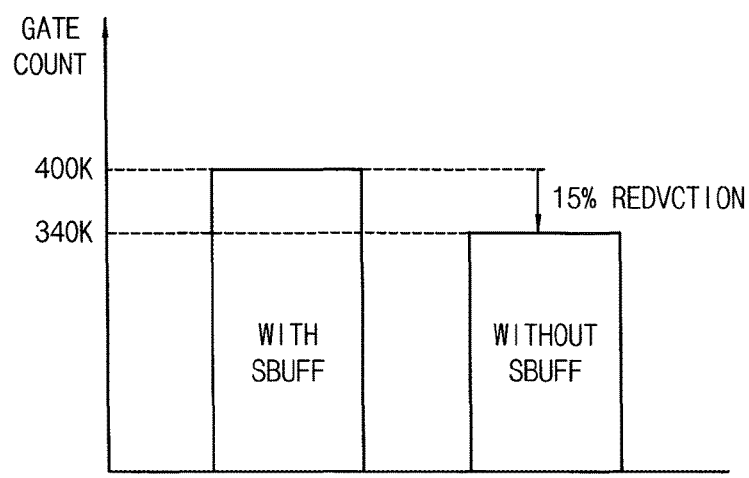
FIG. 17 is a diagram for describing occupation area reduction of a packet transmitter according to various example embodiments.

FIG. 17 is a diagram for describing occupation area reduction of a packet transmitter according to various example embodiments.

Referring to FIG. 17, in an example design, the gate count of the packet transmitter is about 400K (i.e., 400*1000) when the packet transmitter includes the segmentation buffer SBUFF in the higher layer transmission block HTX, and the gate count of the packet transmitter is about 340K (i.e., 340*1000) when the packet transmitter does not include the segmentation buffer SBUFF in the higher layer transmission block HTX. The gate count indicates a desired (or alternatively "predetermined") unit area according to a manufacturing process scale.

The gate count of about 60K (i.e., 60*1000) is reduced by omitting the segmentation buffer, but only the gate count of about 100 is increased for the write pointer generator, etc., and the gate counts associated with the other components has little change. As such, the occupation area of the packet transmitter included in a device and system may be reduced by removing the buffer dedicated to the data segmentation.

Figure 18:
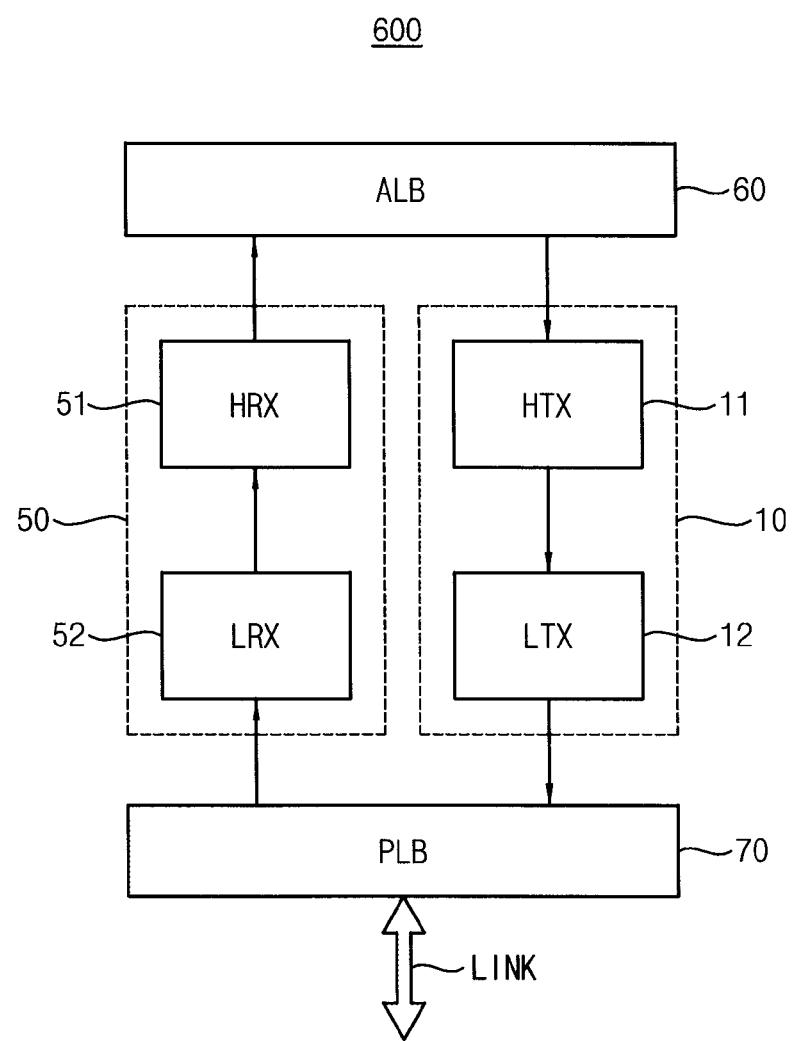
FIG. 18 is a block diagram illustrating an interface circuit according to various example embodiments.

FIG. 18 is a block diagram illustrating an interface circuit according to example embodiments.

Referring to FIG. 18, an interface device 600 include a packet transmitter 10, a packet receiver 50, an application layer block ALB 60 (hereinafter "application layer block 60") and a physical layer block PLB 70 (hereinafter "physical layer block 70").

The physical layer block 70 corresponds to a layer lower than the packet transmitter 10 and the packet receiver 50. The application layer block 60 corresponds to a layer higher than the packet transmitter 10 and the packet receiver 50. The physical layer block 70 is connected to at least one other device, module, and/or system, through a link.

The packet transmitter 10 packetizes a transmission message received from the application layer block 60 into transmission packets and output the transmission packets through the physical layer block 70. The packet receiver 50 decomposes reception packets received through the physical layer block 70 to generate a reception message and transfer the reception message to the application layer block 60.

The packet transmitter 10 includes a higher layer transmission block HTX 11 and a lower layer transmission block LTX 12 that converts the transmission message to the transmission packets by composing the payload data and the headers and send the transmission packets through the link. The packet receiver 50 includes a higher layer reception block HRX 51 and a lower layer reception block LRX 52 that restore the reception message by decomposing the reception packets received through the link into the headers and the payload data.

As described above, the higher layer transmission block 11 generates a higher layer data signal including payload data and a header with respect to each transmission packet based on an application layer data signal including the transmission message and an application layer control signal. The higher layer transmission block 11 outputs the payload data first and output the header after the payload data through the higher layer data signal. The lower layer transmission block 12 generates a lower layer data signal including the header and the payload data with respect to each transmission packet based on the higher layer data signal and a higher layer control signal. The lower layer transmission block 12 outputs the header first and output the payload data after the header through the lower layer data signal.

According to an example embodiment, the packet transmitter 10 and the packet receiver 50 may be compatible with mobile industry processor interface (MIPI) protocol.

The lower layer transmission block 12 may rearrange a storing order of the payload data and the header received from the higher layer transmission block to output the header before the payload data.

In addition, the higher layer transmission block 11 does not include a segmentation buffer for segmenting a transmission message included in the application layer data signal. The lower layer transmission block 12 includes a buffer configured to rearrange a storing order of the payload data and the header received from the higher layer transmission block 11 and configured to perform segmentation of the transmission message and packet retransmission.

As such, the packet transmitter 10 and the interface device 600 including the packet transmitter according to various example embodiments may reduce occupation area by performing data segmentation and data retransmission using a buffer for the data retransmission without another buffer for the data segmentation. In addition, the packet transmitter 10 and the interface device 600 including the packet transmitter according to various example embodiments may reduce latency in packet generation by rearranging the storing order of the header and the payload data and outputting the header and the payload data according to the rearranged storing order.

Figure 19:
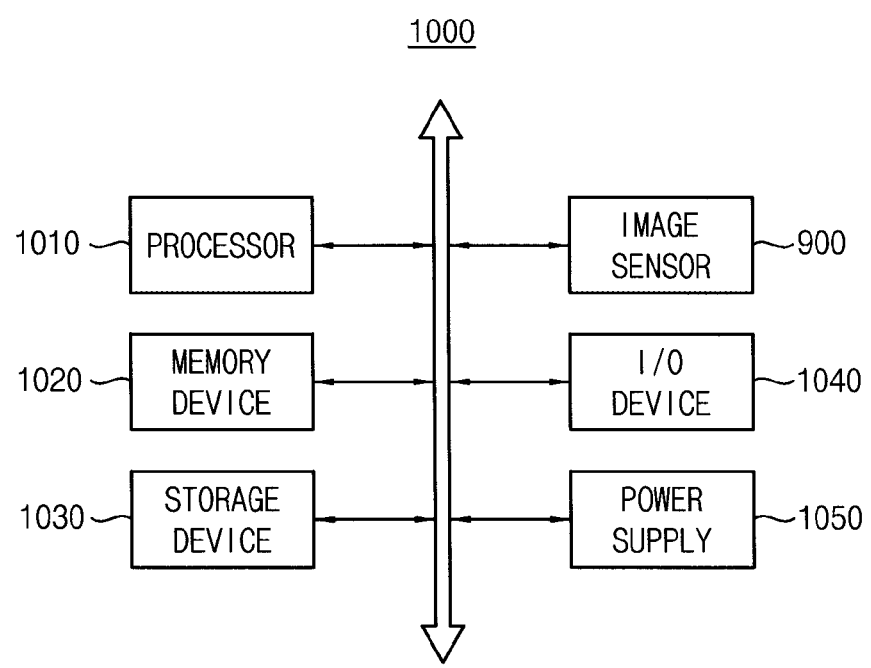
FIG. 19 is a block diagram illustrating a computing system according to various example embodiments.

FIG. 19 is a block diagram illustrating a computing system according to example embodiments.

Referring to FIG. 19, a computing system 1000 may include a processor 1010, a memory device 1020, a storage device 1030, an input/output (I/O) device 1040, a power supply 1050 and an image sensor 900. Although it is not illustrated in FIG. 19, the computing system 1000 may further include a port for communicating with electronic devices, such as a video card, a sound card, a memory card, a USB device, etc.

The processor 1010 may perform specific calculations or tasks. For example, the processor 1010 may be a microprocessor, a central processing unit (CPU), a digital signal processor, or the like. The processor 1010 may communicate with the memory device 1020, the storage device 1030 and the input/output device 1040 via an address bus, a control bus and/or a data bus. The processor 1010 may be coupled to an extension bus, such as a peripheral component interconnect (PCI) bus. The memory device 1020 may store data for operating the computing system 1000. For example, the memory device 1020 may be implemented by a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. The storage device 1030 may include a solid state drive, a hard disk drive, a compact disc read-only memory (CD-ROM), etc. The input/output device 1040 may include an input device, such as a keyboard, a mouse, a keypad, etc., and an output device, such as a printer, a display device, etc. The power supply 1050 may supply power to the computing system 1000.

In some exemplary embodiments, the computing system 1000 and/or components of the computing system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

The computing system 1000 may be any computing system including a packet transmitter (e.g., the packet transmitter 10, etc.) according to various example embodiments. For example, the computing system 1000 may include a digital camera, a mobile phone, a smart phone, a personal digital assistants (PDA), a portable multimedia player (PMP), etc.

At least one of the processor 1010, the memory device 1020, the storage device 1030, the input/output (I/O) device 1040 and the image sensor 900 may include the packet transmitter according to various example embodiments. As described above, the packet transmitter includes a higher layer transmission block and a lower layer transmission block. The higher layer transmission block generates a higher layer data signal including payload data and a header with respect to each transmission packet based on an application layer data signal including the transmission message and an application layer control signal. The higher layer transmission block outputs the payload data first and output the header after the payload data through the higher layer data signal. The lower layer transmission block generates a lower layer data signal including the header and the payload data with respect to each transmission packet based on the higher layer data signal and a higher layer control signal. The lower layer transmission block outputs the header first and output the payload data after the header through the lower layer data signal.

As such, the packet transmitter and the computing system 1000 including the packet transmitter according to example embodiments may reduce occupation area by performing data segmentation and data retransmission using a buffer for the data retransmission without another buffer for the data segmentation. In addition, the packet transmitter 10 and the computing system 1000 including the packet transmitter according to example embodiments may reduce latency in packet generation by rearranging the storing order of the header and the payload data and outputting the header and the payload data according to the rearranged storing order.

FIG. 20 is a block diagram illustrating an example of an interface used in a computing system of FIG. 19 according to various example embodiments.

Referring to FIG. 20, a computing system 1100 may employ or support a MIPI interface, and may include an application processor 1110, an image sensor 1140 (e.g., a camera), and a display device 1150. A CSI host 1112 of the application processor 1110 may perform a serial communication with a CSI device 1141 of the image sensor 1140 using a camera serial interface (CSI). In some exemplary embodiments, the CSI host 1112 may include a deserializer DES, and the CSI device 1141 may include a serializer SER. A DSI host 1111 of the application processor 1110 may perform a serial communication with a DSI device 1151 of the display device 1150 using a display serial interface (DSI). In some exemplary embodiments, the DSI host 1111 may include a serializer SER, and the DSI device 1151 may include a deserializer DES.

The computing system 1100 may further include a radiofrequency (RF) chip 1160. A physical interface (PHY) 1113 of the application processor 1110 may perform data transfer with a PHY 1161 of the RF chip 1160 using a MIPI DigRF. The PHY 1113 of the application processor 1110 may include a DigRF MASTER 1114 for controlling the data transfer with the PHY 1161 of the RF chip 1160.

The computing system 1100 may further include a global positioning system (GPS) 1120, a storage device 1170, a microphone 1180, a DRAM 1185, and a speaker 1190. The computing system 1100 may communicate with external devices using an ultra wideband (UWB) communication 1210, a wireless local area network (WLAN) communication 1220, a worldwide interoperability for microwave access (WIMAX) communication 1230, etc. Exemplary embodiments may not be limited to configurations or interfaces of the computing systems 1000 and 1100 illustrated in FIGS. 14 and 15.

The packet transmitter according to various example embodiments may be applied to any device/system adopting the packet network. For example, according to various embodiments, the packet transmitter may be applied to the electronic devices and system, such as a computer, a notebook, a digital television, a digital camera, a cellular phone, a smart phone, a personal digital assistant (PDA), a portable multimedia player (PMP), a MP3 player, a portable game console, a navigation system, a video phone, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the example embodiments. Accordingly, all such modifications are intended to be included within the scope of the example embodiments as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A packet transmitter included in a computing device, the packet transmitter comprising:
    a higher layer transmission block configured to,
        generate a higher layer data signal, the higher layer data signal including payload data and a header for each packet of a plurality of packets, the payload data and the header for each packet being generated based on an application layer data signal and an application layer control signal,
        output the payload data prior to the header through the higher layer data signal, and
        output the header after the payload data through the higher layer data signal; and
    a lower layer transmission block configured to,
        generate a lower layer data signal including the header and the payload data for each packet of the plurality of packets based on the higher layer data signal and a higher layer control signal,
        output the header prior to the payload data through the lower layer data signal, and
        output the payload data after the header through the lower layer data signal,
    rearrange a storing order of the payload data and the header received from the higher layer transmission block such that the storing order is different than an order in which the payload data and the header are received, and
    output the header before outputting the payload data regardless of the order in which the payload data and the header are received,
    wherein the lower layer transmission block includes,
        a lower layer controller configured to generate a write control signal and a read control signal based on the higher layer control signal, and
        a buffer configured to,
            store the payload data and the header in the higher layer data signal provided from the higher layer transmission block, the storing being in response to the write control signal, and
            generate the lower layer data signal in response to the read control signal.

2. The packet transmitter of claim 1, wherein the higher layer transmission block is further configured to:
    obtain a transmission message included in the application layer data signal without buffering the transmission message, and
    output the transmission message as the payload data.

3. The packet transmitter of claim 1, wherein
    the higher layer transmission block does not include a segmentation buffer configured to segment a transmission message included in the application layer data signal, and
    the lower layer transmission block includes a buffer configured to,
        rearrange a storing order of the payload data and the header received through the higher layer data signal such that the storing order is different from an order in which the payload data and the header are received,
        segment the transmission message, and
        transmit a packet including the payload data and the header.

4. The packet transmitter of claim 1, wherein the higher layer transmission block comprises:
    a higher layer controller configured to generate each of (i) the higher layer control signal, (ii) a header signal, and (iii) an output selection signal based on the application layer control signal; and
    an output selector configured to select, in response to the output selection signal, one of (i) the header included in the header signal and (ii) the payload data included in the application layer data signal to be output in the higher layer data signal.

5. The packet transmitter of claim 4, wherein the higher layer controller is further configured to determine a transition timing of the output selection signal and a generation timing of the header based on (i) a maximum size of the payload data and (ii) an end-of-message signal included in the application layer control signal, the maximum size being a largest amount of payload data that can be included in a single packet, the end-of-message signal indicating an end timing of each message included in the application layer data signal.

6. The packet transmitter of claim 4, wherein the output selector is configured to output the header after the payload data in response to the output selection signal in order to generate the higher layer data signal.

7. The packet transmitter of claim 1, wherein the buffer is configured to rearrange a storing order of the payload data and the header in response to a write pointer included in the write control signal.

8. The packet transmitter of claim 7, wherein the buffer is configured to sequentially output the header and the payload data according to the rearranged storing order in response to a read pointer included in the read control signal to generate the lower layer data signal.

9. The packet transmitter of claim 1, wherein the lower layer controller is configured to:
    control a write pointer included in the write control signal such that the payload data inputted to the buffer is stored according to storing position priorities, the payload data having a lower priority than a priority of the header; and
    in controlling the write pointer, the lower layer controller is configured to store the header in a storing position associated with a higher priority than a storing position for storing the payload data regardless of a timing when the header is inputted to the buffer.

10. The packet transmitter of claim 9, wherein the lower layer controller is configured to sequentially increase a read pointer value according to the storing position priorities such that the header and the payload data are output sequentially according to a rearranged storing order, the read pointer value included in the read control signal.

11. The packet transmitter of claim 1, wherein the lower layer controller includes:
   a first counter configured to generate a payload pointer indicating a storing position of the payload data inputted to the buffer, the first counter configured to generate the payload pointer in response to a transmission valid signal included in the higher layer control signal;
   a second counter configured to generate a header pointer indicating a storing position of the header inputted to the buffer, the second counter configured to generate the header pointing in response to a length signal indicating a size of the payload data currently inputted to the buffer and an end-of-packet signal included in the higher layer control signal, the end-of-packet signal indicating an end timing of each message included in the application layer data signal; and
   a pointer selector configured to select one of the payload pointer and the header pointer in response to a pointer selection signal, the selected one of the payload pointer and the header pointer being used to generate a write pointer indicating a storing position of one of the payload data and the header.

12. The packet transmitter of claim 11, wherein the first counter is configured to sequentially increase the payload pointer while the transmission valid signal is activated.

13. The packet transmitter of claim 11, wherein the second counter is configured to increase the header pointer according to a size of the payload data currently inputted to the buffer when the end-of-packet signal is activated.

14. A packet transmitter included in a computing device, the packet transmitter comprising:
   a higher layer transmission block and a lower layer transmission block, the higher layer transmission block not including a first buffer, the first buffer being a buffer configured to segment a transmission message included in an application layer data signal; and
   the lower layer transmission block including a second buffer, the second buffer is configured to,
      rearrange a storing order of payload data of a transmission message and a header of the transmission message, the transmission message being received through a higher layer data signal such that the rearranged storing order is different from an order in which the payload data and the header is received,
      segment the transmission message for retransmission based on an acknowledgement signal indicating a success or failure of the retransmission, and
      output the header before outputting the payload data regardless of the order in which the payload data and the header are received.

15. The packet transmitter of claim 14, wherein;
   the lower layer transmission block comprises a lower layer controller configured to generate a write control signal and a read control signal based on the transmission message; and
   the second buffer is configured to,
      store the payload data of the transmission message and the header of the transmission message in response to the write control signal, and
      generate a lower layer data signal in response to the read control signal.

16. The packet transmitter of claim 15, wherein the second buffer is configured to sequentially output the header and the payload data according to the rearranged storing order in response to a read pointer included in the read control signal.

17. The packet transmitter of claim 15, wherein the lower layer controller is configured to:
   control a write pointer included in the write control signal such that the payload data inputted to the second buffer is stored according to storing position priorities, the payload data having a lower priority than a priority of the header; and
   in controlling the write pointer, the lower layer controller is configured to store the header in a storing position associated with a higher priority than a storing position for storing the payload data regardless of a timing when the header is inputted to the second buffer.

18. The packet transmitter of claim 17, wherein the lower layer controller is configured to sequentially increase a read pointer value according to the storing position priorities such that the header and the payload data are output sequentially according to a rearranged storing order, the read pointer value included in the read control signal.

* * * * *